United States Patent Office 3,320,330
Patented May 16, 1967

3,320,330
PROCESS FOR THE CATALYTIC OXIDATIVE DEHYDROGENATION OF OLEFINS TO DIOLEFINS
James Louis Callahan, Bedford, Berthold Gertisser, Cleveland Heights, and Joseph J. Szabo, Chagrin Falls, Ohio, assignors to The Standard Oil Company, Cleveland, Ohio, a corporation of Ohio
No Drawing. Original application Apr. 25, 1962, Ser. No. 190,038, now Patent No. 3,248,340, dated Apr. 26, 1966. Divided and this application Sept. 30, 1965, Ser. No. 510,416
7 Claims. (Cl. 260—680)

This is a division of application Ser. No. 190,038, filed Apr. 25, 1962, now U.S. Patent No. 3,248,340.

This invention relates to the catalytic oxidative dehydrogenation of olefins to diolefins, such as butene-1 to butadiene, using an improved oxidation catalyst consisting essentially of oxides of the elements bismuth and molybdenum, and optionally, phosphorus, promoted by oxides of boron and bismuth.

The Callahan, Foreman and Veatch U.S. Patent No. 2,941,007 describes the oxidation of an olefin such as propylene and the various butenes with oxygen and a solid catalyst composed of the oxides of bismuth, molybdenum and silicon, and optionally, phosphorus. This catalyst selectively converts propylene to acrolein, isobutylene to methacrolein, α- and β-butylene to methyl vinyl ketone and to butadiene, etc. High yields are obtainable, although in the case of the butenes, careful control of reaction conditions may be required in order to direct the reaction in favor of either methyl vinyl ketone or butadiene, depending upon which of these alternative products is desired.

The Idol U.S. Patent No. 2,904,580 employs the same catalyst to convert propylene, ammonia and oxygen to acrylonitrile, at approximately atmospheric pressures and elevated temperatures. Excellent conversions, usually in the range of 40 to 80%, nitrogen basis, of useful products are obtainable.

THE CATALYST

In accordance with the instant invention, the catalytic activity of such bismuth oxide-molybdenum oxide catalysts is greatly enhanced or promoted by the combination therewith of a mixture of boron and additional bismuth in the form of their oxides, referred to hereinafter as promoters. The promoters in accordance with the invention are best applied by impregnation or surface coating of the catalyst, after its formation in accordance with the procedure described in Ser. No. 851,919, filed Nov. 9, 1959, now U.S. Patent No. 3,044,966, the disclosure of which is hereby incorporated by reference. Further, in accordance with the invention, it has been determined that a portion of the supplemental bismuth oxide promoter can be replaced with manganese oxide, and that phosphorus oxide can also be present as a supplemental oxide.

The proportions of boron oxide and bismuth oxide, with or without phosphorus oxide and/or manganese oxide, are important in obtaining the optimum enhanced activity. The boron oxide concentration, calculated as boron, should be within the range from about 0.5 to about 1% by weight; and the amount of bismuth oxide, calculated as bismuth, should be within the range from about 5% to about 10% by weight, although more than 10% can be used, if desired. If manganese oxide is employed, it can be used on a bismuth oxide equivalent weight basis, but not more than about one third of the promoter bismuth oxide, calculated as bismuth, can be replaced by manganese oxide.

While the catalyst of this invention may be employed without any support, it is desirable to combine it with a support. A preferred support is silica because the silica improves the catalytic activity of the catalyst. The silica may be present in any amount but it is preferred that the catalyst contain between about 25 to 75% by weight of silica. Many other materials such as Alundum, silicon carbide, alumina-silica, alumina, titania and other chemically inert materials may be employed as a support which will withstand the conditions of the process.

The catalyst may comprise phosphorus, also present in the form of the oxide. Phosphorus will affect, to some extent, the catalytic properties of the composition, but the presence or absence of phosphorus has no appreciable effect on the physical properties of the catalyst. Thus, the composition can include from 0%, and preferably from at least 0.1%, up to about 5% by weight of phosphorus oxide, calculated as phosphorus.

The promoter is incorporated with the catalyst base by impregnation thereof, using an aqueous solution, dispersion, or suspension of a boron compound and of a bismuth compound, with or without a manganese compound, either the oxide, or a compound thermally decomposable in situ to the corresponding boron oxide, bismuth oxide, and manganese oxide, respectively, without formation of other deleterious metal oxide residue, for instance, ammonium phosphate, ammonium tetraborate, ammonium permanganate, manganese nitrate, bismuth nitrate, boric acid, bismuth hydroxide, manganese hydroxide, bismuth phosphate, and bismuth borate. The phosphorus-containing compounds also add phosphorus to the catalyst. After impregnation with such solution, employed in a concentration and amount to provide the desired amount of bismuth and boron, and optionally, manganese, the catalyst base is dried, and then calcined at a temperature above that at which the compounds applied are decomposed to the oxides. Temperatures in excess of 800° F. but below that at which the catalyst is deleteriously affected, usually not in excess of about 1050° F., can be used.

The basic catalyst composition comprises bismuth oxide and molybdenum oxide, the bismuth-to-molybdenum ratio Bi:Mo being controlled so that it is at all times above 1:3. There is no critical upper limit on the amount of bismuth, but in view of the relatively high cost of bismuth and the lack of an improved catalytic effect when large amounts are used, generally the atomic ratio bismuth to molybdenum Bi:Mo of about 3:1 is not exceeded. The nature of the chemical compounds which compose the basic catalyst is not known. The catalyst may be a mere mixture of bismuth and molybdenum oxides, with or without phosphorus oxide, but it seems more likely that the catalyst is a homogeneous micro mixture of loose chemical combinations of oxides of bismuth and molybdenum, with, optionally, phosphorus, and it is these combinations which appear to impart the desirable catalytic properties to this catalytic composition. The catalyst can be referred to as bismuth molybdate, or, when phosphorus is present, as bismuth phosphomolybdate, but this term is not to be construed as meaning that the catalyst is composed of these compounds.

The bismuth and boron, and optionally, manganese, compounds added thereto as promoters may or may not enter into the chemical composition of the catalyst. Bismuth added later with boron produces a different result from boron added to a catalyst composition containing more than the usual amount of bismuth, i.e., that stoichiometrically equivalent to the weight of added boron, and has a different function, since the enhanced catalytic effect is not obtained when boron oxide is combined with a composition previously containing the same excess of bismuth. Hence, the promoted catalytic effect may be due to some complex boron oxide-bismuth oxide combination formed on the surface of the catalyst.

In any event, the boron and bismuth are present in the form of their oxides, when combined therewith later in accordance with the invention.

The bismuth molybdate catalyst composition of the invention may have the following composition ranges, as long as the atomic ratio of bismuth to molybdenum is above 1:3:

| Element: | Weight percent |
|---|---|
| Bismuth | 29.84–78.08 |
| Molybdenum | 11.32–47.29 |
| Oxygen | 9.96–26.84 |
| Phosphorus | 0–2.40 |

This same composition may be expressed in the form of the following empirical formula:

(1)     $Bi_aP_bMo_{12}O_c$ where $a$ is 4 to 36, $b$ is 0 to 2, and $c$ is $$\tfrac{1}{2}n\cdot a + \tfrac{1}{2}m\cdot b + \tfrac{1}{2}p\cdot 12$$

and where $n$, $m$ and $p$ are the average valences of bismuth, phosphorus and molybdenum, respectively, in the oxidation states in which they exist in the catalyst as defined by the empirical formula above. Thus $n$ may range from 2 to 3, $m$ is about 5, and $p$ may range from 4 to 6, which collectively make $c$ range from 28 to 94.

When silica is used as the support, the empirical formula is (2)     $Bi_aP_bMo_{12}O_c \cdot (SiO_2)_{1 \text{ to } 600}$ where $a$, $b$ and $c$ are as defined above.

When the silica is present as about 30 to 70 weight percent of the final composition, the empirical formula is (3)     $Bi_aP_bMo_{12}O_c \cdot (SiO_2)_{30 \text{ to } 150}$ where $a$, $b$ and $c$ are as defined above.

To this are to be added bismuth oxide and boron oxides, as such or as formed in situ from other added bismuth and boron compounds, so that the empirical formula of the promoted catalyst in accordance with the invention corresponds to the following:

(4)     $85\text{–}93\% (Bi_aP_bMo_{12}O_c \cdot (SiO_2)_{0\text{–}600})$
        $\cdot 5.5\text{–}11.5\% \ Bi_2O_3 \cdot 1.5\text{–}3.5\% \ B_2O_3$ The values of $a, b$ and $c$ are in accordance with the definitions given above.

When the atomic ratio of bismuth to molybdenum Bi:Mo is about 3:4, the empirical formula is (5)     $85\text{–}93\% (Bi_9P_bMo_{12}O_c \cdot (SiO_2)_{0\text{–}600})$
        $\cdot 5.5\text{–}11.5\% \ Bi_2O_3 \cdot 1.5\text{–}3.5\% \ B_2O_3$ The values of $b$ and $c$ are as defined above.

When the silica is present as about 30 to 70 weight percent of the final composition, the empirical formula is (6)     $85\text{–}93\% (Bi_aP_bMo_{12}O_c \cdot (SiO_2)_{30\text{–}150})$
        $\cdot 5.5\text{–}11.5\% \ Bi_2O_3 \cdot 1.5\text{–}3.5\% \ B_2O_3$ where $a$, $b$ and $c$ are as defined above.

OXIDATIVE DEHYDROGENATION OF OLEFINS TO DIOLEFINS

The present invention provides a process for the catalytic dehydrogenation of normal butylene, tertiary amylenes, and similar higher olefins having up to eight carbon atoms to the corresponding diolefins. In this process the feed stream in vapor form containing the olefin to be dehydrogenated and oxygen preferably is conducted over the catalyst at a comparatively low temperature between about 750 and 1000° F., to obtain the corresponding diolefin.

THE REACTANTS

This process is capable of dehydrogenating normal butylenes to butadiene and tertiary amylenes to isoprene, but it can also be used to dehydrogenate normal amylenes to piperylene, and higher olefins, e.g., hexenes, heptenes, and octenes, to the corresponding more unsaturated products. The normal butylene can be butene-1 or butene-2, either cis or trans, or a mixture of normal butylenes, such, for example, as can be separated from the products obtained in the cracking of petroleum oils or by the catalytic dehydrogenation of normal butane. The tertiary amylene can be any one or a mixture of the amylenes having one tertiary carbon atom. The feed stock can contain inert diluents such as any paraffinic or naphthenic hydrocarbon having up to about ten carbon atoms. Propylene and isobutylene should not be included in amounts exceeding a few percent.

The feed stock is preferably catalytically dehydrogenated in the presence of added steam, but this is not essential. Recommended proportions of steam are between about 0.1 to 2 moles per mole of reactant, but larger amounts can be used if desired.

Oxygen is also passed with the feed stock through the reaction zone. Recommended amounts are between about 0.3 and 2 moles per mole of olefin reactant. The stoichiometric quantity is 0.5 mole per mole of olefin. It is preferred to use a stoichiometric excess, e.g., about one mole per mole of olefin. The oxygen may be supplied as pure or substantially pure oxygen, or air, or in the form of hydrogen peroxide.

It is generally preferred to maintain the concentration of oxygen in the reactant mixture entering the reactor below about 12% although somewhat higher concentrations may be used if the concentration of the olefin reactant is at least about 10% when operating at 30 p.s.i.g., at least 15% when operating at 100 p.s.i.g., and at least about 20% when operating at 300 p.s.i.g. Thus when using pure oxygen, it is frequently desirable to dilute the mixture with an inert or substantially inert diluent which may be steam, vapors of paraffin hydrocarbons, $CO_2$, or the like. On the other hand, if the amount of oxygen is such that it would constitute more than about 12% of the reaction mixture the oxygen may be introduced in increments, e.g., by injecting part of the oxygen separately into the reaction zone.

PROCESS CONDITIONS

With the preferred catalyst the dehydrogenation becomes substantial at about 340° C. The preferred reaction temperatures are between about 400 and 550° C. Higher temperatures up to about 600° C. can be used, if means is provided to remove the exothermic heat of reaction. The temperatures mentioned are those near the reactor inlet. If a fixed bed of catalyst is used the temperature downstream will be as much as 75° C. higher.

The preferred pressure is near atmospheric, e.g., 5 to 75 p.s.i.a. On the other hand, higher pressures up to about 300 p.s.i.a. can be used, and have the advantage of simplifying the product recovery.

The process of the present invention allows a high space velocity, and thus, comparatively small reactors and catalyst can be used. For example, gaseous hourly space velocities up to about 5000 may be employed while still obtaining reasonable conversions. Gaseous hourly space velocity, abbreviated GHSV, is defined as the volumes of reactant vapor calculated under standard condition (STP) passed per hour per unit volume of the catalyst bed. Generally, space velocities between about 50 and 1000 are very satisfactory.

The contact of the feed vapors, oxygen and steam, if any, is preferably effected by providing the catalyst in the form of a fixed bed maintained at the reaction temperature, and passing the feed vapors through the bed. In this method of operation the partial pressure of oxygen is high (maximum) at the inlet of the catalyst bed and declines towards the outlet. The concentration of diolefin product, on the other hand, is substantially zero at the inlet of the bed and maximum at the outlet. This allows very high selectivities to be achieved. It is also possible to use the catalyst in powder form, but certain precautions should be taken. Thus, the powdered catalyst (e.g., passing a 100 mesh U.S. Standard sieve) can be dispersed in the reactant vapor mixtures and the dispersion passed through the reaction zone.

The gaseous mixture issuing from the reaction zone may be quenched but this is normally not essential. Except in some cases when operating at the upper limit of the recommended temperatures there is little tendency for side reactions to take place. The effluent is preferably cooled by indirect heat exchange with the feed and then washed with dilute caustic to neutralize the organic acids present and condense and remove the steam. If air is used to supply the oxygen the remaining mixture is preferably compressed and scrubbed with oil to separate the hydrocarbons from the nitrogen, carbon dioxide, and carbon monoxide. The hydrocarbon may be stripped from the oil and subjected to an extractive distillation or a copper ammonium acetate treatment in the known manner to separate and recover the diolefin.

The following examples, in the opinion of the inventors, represent preferred embodiments of their invention:

*Example 1*

A bismuth silicophosphomolybdate catalyst base was prepared by the following procedure:

74 g. of an 85% phosphoric acid was added to 8330 g. of an aqueous silica sol containing 30% silica. Next, 2800 g. of bismuth nitrate was dissolved in a solution made by diluting 160 ml. of 70% nitric acid to 1540 ml. with distilled water. The bismuth nitrate solution was then added to the silica sol. Next, 1360 g. of ammonium molybdate was dissolved in 1540 ml. of distilled water, and this solution added to the silica sol. The resulting catalyst slurry was dried in an oven at 200° F. for 24 hours and then calcined in a furnace at 800° F. for 24 hours. After cooling, the catalyst was ground into particles, and screened through a 10 mesh screen. A portion of the 8–10 mesh material was then made into tablets, while the remainder was retained for use as a control, designated hereinafter as Control A.

The final catalyst composition corresponded to the empirical formula $Bi_9PMo_{12}O_{52} \cdot (SiO_2)_{65}$, having the following composition:

| Element: | Weight Percent |
| --- | --- |
| Bismuth | 24.2 |
| Phosphorus | 0.4 |
| Molybdenum | 14.8 |
| Silicon | 23.4 |
| Oxygen | 37.2 |

This tabletted catalyst was then impregnated with promoters in accordance with the invention, by the following procedure:

81.8 g. of boric acid was dissolved in hot water and diluted up to 420 ml. This hot solution was used to impregnate 400 g. of the tabletted catalyst prepared as described above, dipping tablets of the catalyst contained in a wire basket in the boric acid solution for 4 minutes, then removing and draining them for 4 minutes. By this procedure, 120 ml. of the boric acid solution was absorbed by the catalyst, equivalent to 23 g. $H_3BO_3$. The wet catalyst was dried overnight, and a portion was set aside, for use later as Control C.

The remainder of the boric-acid impregnated catalyst was mixed well with a solution prepared by dissolving 47 g. of bismuth nitrate $Bi(NO_3)_3 \cdot 5H_2O$ in 40 cc. of concentrated nitric acid, specific gravity 1.42, diluting to 120 cc. with water. Another portion of the base catalyst (Control A), not previously impregnated with boric acid solution, was then impregnated with bismuth nitrate solution in the same way. This was marked Control B. Again, the catalyst was dried at 120° C. overnight.

Controls B and C and the twice impregnated catalyst of the invention then were calcined in air for 14 to 16 hours at 800° F. Finally, the three calcined catalysts were ground and screened, to obtain a size fraction in the 8 to 10 mesh range.

Thus, Control B contained 5% added bismuth, Control C 1% boron, Control A neither, and the catalyst of the invention, 5% added bismuth and 1% added boron together.

The promoted catalyst and the control catalysts A, B, and C without promoters and with only one promoter were employed in a series of experiments, to determine catalytic effectiveness, using a fixed bed reactor, in the oxidative conversion of propylene and ammonia to acrylonitrile. A 90 ml. catalyst charge was used in each run. Gases were metered by rotameter, and water was fed by a Sigma motor pump. The feed ratios were held constant at $H_2CCH-CH_3/NH_2/air/N_2/H_2O$ 1/1.5/12/4/0.8, and the contact time was held constant at 5 seconds. The reaction temperature was varied from 860 to 950° F. in the series of runs carried out. At the optimum temperature range of 865 to 875° F. 92.6% of the propylene feed was converted, 73.2% being converted to acrylonitrile, 8.4% to acetonitrile, and the remainder to a mixture of carbon dioxide and hydrogen cyanide. The useful yield was 89.6%.

In contrast, Control A, the base catalyst without promoters, at the optimum temperature of 860–870° F., gave a total conversion of 93.2%, of which 63.4% was acrylonitrile, 13% acetonitrile and the remainder, carbon dioxide and hydrogen cyanide. The useful yield was 78.6%. The Bi-promoted Control B at the optimum temperature of 860° F. gave a total conversion of 85.6%, of which 58.7% was acrylonitrile, 9.1% acetonitrile, and the remainder carbon dioxide and hydrogen cyanide. The useful yield was 70.9%. The B-promoted Control C at the optimum temperature of 880° F. gave a 44.1% total conversion, of which 37.4% was acrylonitrile, 3% acetonitrile, 1.7% acrolein, and the remainder, carbon dioxide and hydrogen cyanide.

Thus, boron alone acts as a poison, not as a promoter, bismuth alone also has a definite depressing effect on maximum yield, while the two together materially enhance the catalytic effect, as compared to the base catalyst.

*Example II*

Butene-1 was dehydrogenated to butadiene using the bismuth and boron promoted catalyst of Example I in a fixed bed reactor. The butene-1 feed was mixed with air and water in the molar ratio butene/air/water 1/8/4 and preheated to 850° F. The temperature in the reactor was held at 850–860° F. The residence time in contact with the catalyst was six seconds. 300 ml. of catalyst was used. The per pass conversion to 1,3-butadiene was 75%, together with about 6% oxygenated products, the balance being carbon dioxides.

*Example III*

Trans-butene-2 was dehydrogenated to butadiene using the bismuth and boron promoted catalyst of Exampe I in admixture with air and steam. The reactor temperature was held at 835–845° F. and the molar ratios butene/air/water at 1/8/4. The residence time in contact with the 300 ml. of catalyst was four seconds. A per pass conversion to 1,3-butadiene of 76% was obtained, the balance of the product being carbonyl compounds and carbon oxides.

All percentages in the specification and claims are by weight, in the case of the catalyst composition, and by volume in the case of gases.

We claim:

1. A process for the dehydrogenation of monoolefins to diolefins which comprises contacting the olefin and oxygen in the vapor phase at a temperature at which dehydrogenation proceeds with a catalyst composition consisting essentially of oxides of bismuth and molybdenum as the essential catalytic ingredients, the bismuth oxide being present in an amount to furnish a bismuth to molybdenum Bi:Mo atomic ratio of above 1:3, promoted by a mixture of oxides of boron and bismuth, in the proportion of about 0.5 to about 1%, calculated as boron, and about 5 to about 10%, calculated as bismuth.

2. The process in accordance with claim 1, in which the olefin is a butene.

3. The process in accordance with claim 2, in which the olefin is butene-1.

4. A process in accordance with claim 1, in which the catalyst composition also includes phosphorus in an amount up to about 5% by weight.

5. A process in accordance with claim 1, in which the catalyst composition includes manganese oxide as a promoter in an amount up to about one-third the weight of the bismuth oxide promoter.

6. A process in accordance with claim 1, in which the catalyst composition also includes silica, the silica being present in an amount from about 25 to about 75% by weight of the catalyst.

7. A process in accordance with claim 6, in which the catalyst composition also includes phosphorus in an amount up to about 5% by weight.

References Cited by the Examiner

UNITED STATES PATENTS

| | | | |
|---|---|---|---|
| 2,991,320 | 7/1961 | Hearne et al. | 260—680 |
| 3,044,966 | 7/1962 | Callahan et al. | 252—437 |
| 3,161,670 | 12/1964 | Adams et al. | 260—680 X |

PAUL M. COUGHLAN, JR., *Primary Examiner.*